United States Patent [19]
Specht et al.

[11] Patent Number: 5,897,079
[45] Date of Patent: Apr. 27, 1999

[54] AIR CURTAIN INSULATING SYSTEM FOR AIRCRAFT CABIN

[75] Inventors: Philip R. Specht, Lakewood; Julie F. Asfia, Beverly Hills; Tim G. Buzza, Seal Beach, all of Calif.; Andy von Flotow, Hood River, Oreg.

[73] Assignee: McDonnell Douglas Corporation, St. Louis, Mo.

[21] Appl. No.: 08/912,523

[22] Filed: Aug. 18, 1997

[51] Int. Cl.$^6$ .................................................. B64D 13/08
[52] U.S. Cl. ........................ 244/118.5; 244/119; 454/71
[58] Field of Search ............................... 244/119, 118.5; 454/71, 76, 77, 83, 87, 99, 100

[56] References Cited

U.S. PATENT DOCUMENTS

| | | | |
|---|---|---|---|
| 106,771 | 8/1870 | Bestor | 244/118.5 |
| 1,738,670 | 12/1929 | Rohrbach | 244/119 |
| 2,027,315 | 1/1936 | Higgins | 244/118.5 |
| 2,427,698 | 9/1947 | Arnhym | 98/33 |
| 3,032,298 | 5/1962 | Callahan | 244/119 |
| 3,740,905 | 6/1973 | Adams | 52/173 |
| 4,726,426 | 2/1988 | Miller | 244/118.5 |
| 4,742,760 | 5/1988 | Horstman | 244/118.5 |
| 5,479,983 | 1/1996 | Fischer et al. | 244/118.5 |

FOREIGN PATENT DOCUMENTS

| | | | |
|---|---|---|---|
| 3812739 | 7/1989 | Germany | 244/118.5 |
| 94891 | 3/1939 | Sweden | 244/118.5 |

*Primary Examiner*—Gala Barefoot
*Attorney, Agent, or Firm*—Westerlund & Powell, PC; Robert A. Westerlund; Ramon R. Hoch

[57] ABSTRACT

The present invention encompasses a system and method for insulating an aircraft passenger cabin from ambient temperatures without the need for insulation blankets. Hot bleed air flowing through a network of fluid passageways is directed into sealed bays formed between the outer skin of the fuselage and the wall panels of the passenger cabin. As the hot bleed air rises through the sealed bays, it insulates the interior of the passenger cabin from the outside ambient temperatures. The outer skin of the aircraft acts as a heat exchanger by removing heat from the bleed air before it is introduced into the cabin. The bleed air maintains the cabin at a comfortable temperature without the need for air conditioning when the aircraft operates at high altitude.

22 Claims, 3 Drawing Sheets

AIR CURTAIN INSULATING SYSTEM FOR AIRCRAFT CABIN

BACKGROUND OF THE INVENTION

The present invention generally relates to aircraft insulation systems employed to reduce the loss of heat from the aircraft cabin to the surrounding ambient atmosphere. More particularly, the present invention relates to a new hot bleed air distribution and insulation system which completely eliminates the need for conventional insulation blankets, thereby significantly reducing the aircraft manufacturer's material and production costs as well as the operator's corrosion repair costs.

Insulation blankets are currently employed on passenger aircraft to provide acoustic attenuation of wind noise and, more importantly, to reduce the loss of heat from the interior of an aircraft passenger cabin. A conventional insulation blanket system disclosed in U.S. Pat. No. 2,427,698 requires electrical heaters to heat and blowers to circulate heated air throughout the cabin.

At cruising altitudes achieved by today's jet aircraft, ambient temperature often drops as low as −40° C., causing water vapor inside the aircraft cabin to condense onto cold metallic surfaces and become absorbed by conventional insulation blankets located in passageways extending between the passenger cabin wall panels and the outside skin of the aircraft fuselage. As a result, the weight of the insulation material can often increase the total weight of the insulation blankets by a factor of three over a three year period of time. Because wet insulation blankets have a higher thermal conductivity than dry blankets, the heat transfer rate increases, reducing the insulating effect of the blankets.

Wet insulation blankets create a number of expensive problems in the aircraft industry. The water absorbed by the insulation blankets causes corrosion of the aircraft structure. Repairing the resulting corrosion damage to the aircraft structure is very costly and may require the aircraft to be pulled from normal operation during repair. Many cases of water actually dripping into the cabin (known as "Rain in the Plane") are known to have occurred.

Insulation blankets employed in a conventional twinjet aircraft have been documented to retain an average maximum weight of 1,500 lb. and an average minimum weight of 330 lb. of water. Trijet aircraft have been documented to retain an average maximum weight of 2400 lb. and an average minimum weight of 660 lb. of water. It has been estimated that the water carried by the insulation blankets requires extra fuel costing about $14,000.00 per year per twinjet and that the water is responsible for up to five percent of the overall corrosion repair costs. While these changes in weight and resulting fuel increases may not arise with every aircraft, they are believed to be typical of the problems associated with employing insulation blankets.

In order to combat the adverse effects of water absorption by convention al insulation blankets, U.S. Pat. No. 3,740,905 suggests that insulation blankets be arranged to allow condensing moisture to drain and be collected in a central collection point. The collected water is then used to introduce humidity into the passenger compartment. As will become clear, the present invention significantly reduces the need for insulation blankets as well as a separate humidifier system.

Recognizing the need to maintain dry insulation blankets, U.S. Pat. No. 5,577,688 suggests a process and structure wherein moisture condensed within a bag of insulation material is allowed to pool under gravity, with air flowing through the enclosed space containing the bags removing the condensed liquid. While the '688 patent attempts to solve the problem by equalizing the pressure within individual insulation blankets using a source of dry air as opposed to humid cabin air, once again the corrosion and weight problems associated with insulation blankets are, at best, only somewhat reduced, and not eliminated.

Based on the above and foregoing, it can be appreciated that there presently exists a need in the art for a system and method capable of maintaining aircraft passenger cabins at comfortable temperatures while, at the same time, eliminating the problems inherent with the use of insulation blankets The successful solution must not be more costly than the current system and, if possible, should be a less expensive system to install, operate and maintain. The present invention fulfills this need in the art.

SUMMARY OF THE INVENTION

The present invention encompasses a system and method for maintaining an aircraft passenger cabin at a comfortable temperature without the need for insulation blankets, except at locations such as the door panels where there are no air flow passageways. Heated air, i.e. hot bleed air, is introduced into passageways extending through pre-existing bays formed by the outer skin of the aircraft fuselage and confronting wall panels of the passenger cabin. The hot bleed air rises through the bays, with the fuselage outer skin functioning as a heat exchanger to progressively lower the temperature of the bleed air as it rises through the bays. Because such bays are already present in the side walls of most passenger aircraft, it is possible to create an air flow distribution and insulation system without the need or cost of removing the passenger cabin panels in order to construct air passageways. The use of bleed air also eliminates the problem of water vapor condensing on the aircraft's inner skin, frames, and stringers, while maintaining the desired cabin temperature at a fraction of the current costs associated with employing conventional insulation blankets.

In order to provide maximum insulating value to the passenger cabin, each bay should provide optimal flow rate of hot bleed air from the bottom portion of the bay located adjacent the cargo compartment to the top portion of the bay located adjacent the open air attic extending above the passenger cabin.

Hot bleed air from the engine compartment is directed though a central supply duct which preferably lies beneath the cargo compartment and extends parallel to the longitudinal axis of the aircraft. In order create a uniform and smooth airflow through each sealed bay, a separate air inlet conduit extends between the hot bleed air supply duct and each of the sealed bays. A smooth stream of hot air bleed flowing from the supply duct enters and rises through each of the sealed bays before being discharged into the attic. This new environmental system is designed to be used in conjunction with an air conditioning system. Whenever the fuselage outer skin rises above a predetermined temperature, the conditioning system would need to be used to cool the passenger cabin. The hot bleed air decreases in temperature in a predictable, progressive manner as it flows through the supply duct and rises through the sealed bay before entering the attic. The metallic outer skin of the fuselage functions as a heat exchanger to remove heat from the hot bleed air before the cooled bleed air is employed to maintain the passenger cabin at the desired temperature.

By knowing the rate of decrease in the temperature of hot bleed air rising through a sealed bay and by knowing the temperature of the hot air flowing through the supply duct, the resulting temperature of the bleed air discharged into the attic can be computed. In order to maintain a uniform distribution of hot bleed air within each sealed bay, an orifice is positioned in each transverse conduit to control the flow of bleed air entering the bays. In the present invention, the total air flow rate of the hot bleed air is designed to be approximetly equal to the air flow rate of a conventional air conditioning system. As can be well understood, the bleed air distribution and insulation system described in the present invention achieves the added benefit of having the cooled bleed air serving to air condition the passenger cabin without the need for running the air conditioning system when cruising at high altitudes having low ambient temperatures.

With the present invention it is possible to keep some parts of the aircraft, such as the avionics systems, at temperatures much colder than the temperature maintained in the passenger cabin. The attic passageway extending above the passenger cabin can be divided into separate upper and lower portions by positioning a secondary ceiling between the aircraft outer skin and the passenger cabin ceiling. In a preferred embodiment, approximately twenty percent of the bleed air flows a greater distance through the sealed bays and exits into an upper portion of the attic passageway, while the remaining approximately eighty percent of the bleed air flows a shorter distance through the days before entering a lower portion of the attic located directly above the passenger cabin. Because the bleed air entering the upper portion of the attic lows a greater distance adjacent the cold, outer skin of the aircraft, this portion of the bleed air is cooled to a lower temperature than the bleed air entering the lower portion of the attic. This cooler bleed air is collected for cooling flight apparatus such as the aircraft avionics system. The remaining eighty percent of the bleed air flowing through the lower portion of the attic passageway is directed through air conditioning grills into the passenger cabin. For example, twenty percent of the bleed air could be further cooled to a temperature of approximately 3.3° C. for cooling the avionics system while the remaining eighty percent of the bleed air remains at a temperature of approximately 22° C. for introduction into the cabin. Since the air dew-point is much lower than these temperatures, no condensation is anticipated to occur. While a twenty percent/eighty percent split is preferred to assure adequate cooling of the avionics apparatus without causing discomfort to the passengers, the actual split may differ depending on the cooling requirements of the particular aircraft.

In the present invention, the metallic skin of the aircraft fuselage is used to cool the hot bleed, thereby cooling the bleed air to an appropriate temperature for direct introduction into the aircraft passenger cabin. In order to avoid overcooling the hot bleed air as it flows through the sealed bays, a thin coating may be applied to the inner skin of the fuselage to reduce its thermal conductivity. Whether or not such a coating is applied, the need for employing conventional insulation blankets throughout the aircraft is significantly reduced to use of blankets only where there is no flow passageway, such as in the door panels of the aircraft. By essentially eliminating the need for insulation blankets, the need to collect and remove water vapor condensing in the insulation material is also essentially eliminated. Estimated acoustic penalties of 1 or 2 dB(A) may arise by significant reduction of the insulation blankets. These penalties can either be tolerated or reduced by other means not considered part of the present invention.

BRIEF DESCRIPTION OF THE DRAWINGS

These and other features, aspects, and advantages of the present invention will be more fully understood when considered with respect to the following detailed description, appended claims, and accompanying drawings, wherein:

DETAILED DESCRIPTION OF THE INVENTION

The present invention provides an air flow system and method for maintaining an aircraft passenger cabin at a desirable, comfortable temperature without the need for insulation blankets located between the cabin wall and the outer skin of the aircraft fuselage.

Figure 1:
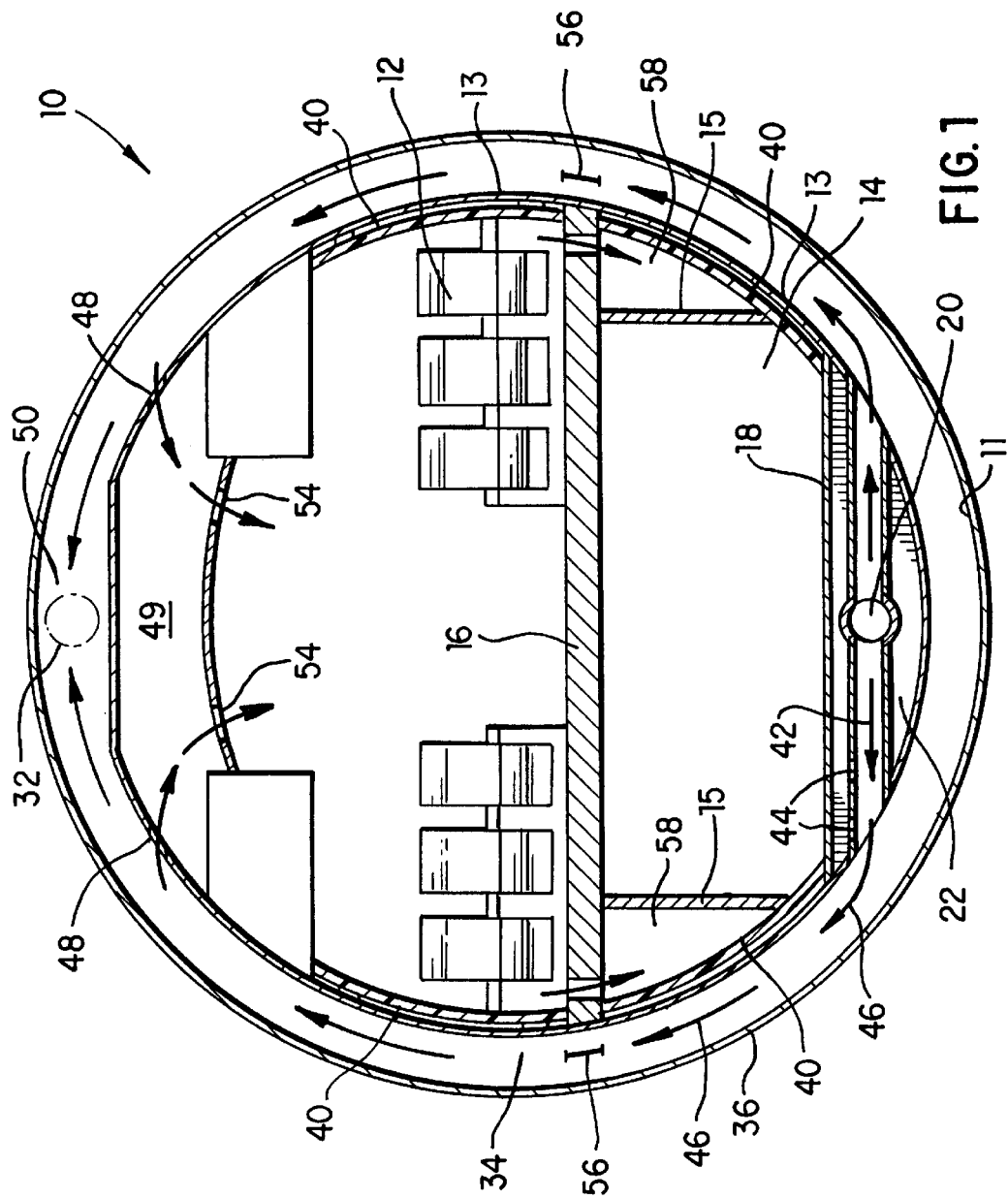
FIG. 1 is a schematic, cross-sectional view of an aircraft fuselage incorporating an air curtain insulation system constructed in accordance with the present invention.

Referring to FIG. 1, a cross-sectional view of a substantially circular aircraft fuselage is shown at 10. Fuselage 10 includes a passenger cabin 12 extending above a cargo compartment 14, and separated by a main floor 16. A cargo floor 18 extends beneath cargo compartment 14. Cargo compartment 14 further includes a pair of oppositely disposed support walls 15, each extending in a generally vertical direction into attachment with main floor 16. Interior wall panels 40 extend between cargo floor 18 and main floor 16, and are curved to extend substantially parallel to the outer skin 36 of fuselage 10. Interior panels 40 and outer skin 36 form air flow passageways defined between their respective outer surfaces 13 and inner surface 11 allowing hot bleed air to rise through passageways extending adjacent to cargo compartment 14 and passenger cabin 12 in a manner which will hereinafter become clear. It is to be understood that the stacked arrangement of the passenger cabin above the cargo compartment as described above is considered typical for passenger aircraft and is not considered part of the present invention. What is unique to the present invention is utilizing the pre-existing aircraft structure for delivering a stream of hot bleed air to a location adjacent the passenger cabin which allows the hot bleed air to insulate the cabin from ambient temperatures outside the aircraft without the need for deploying insulation blankets. The hot bleed air effectively functions as an insulating curtain between the cold curtain between the cold outer skin of the aircraft and the passenger cabin, while at the same time the hot bleed air is cooled to a temperature such that it can be introduced directly into the passenger cabin, thereby eliminating the need for operating the aircraft air conditioning system during high altitude cruise.

Figure 2:
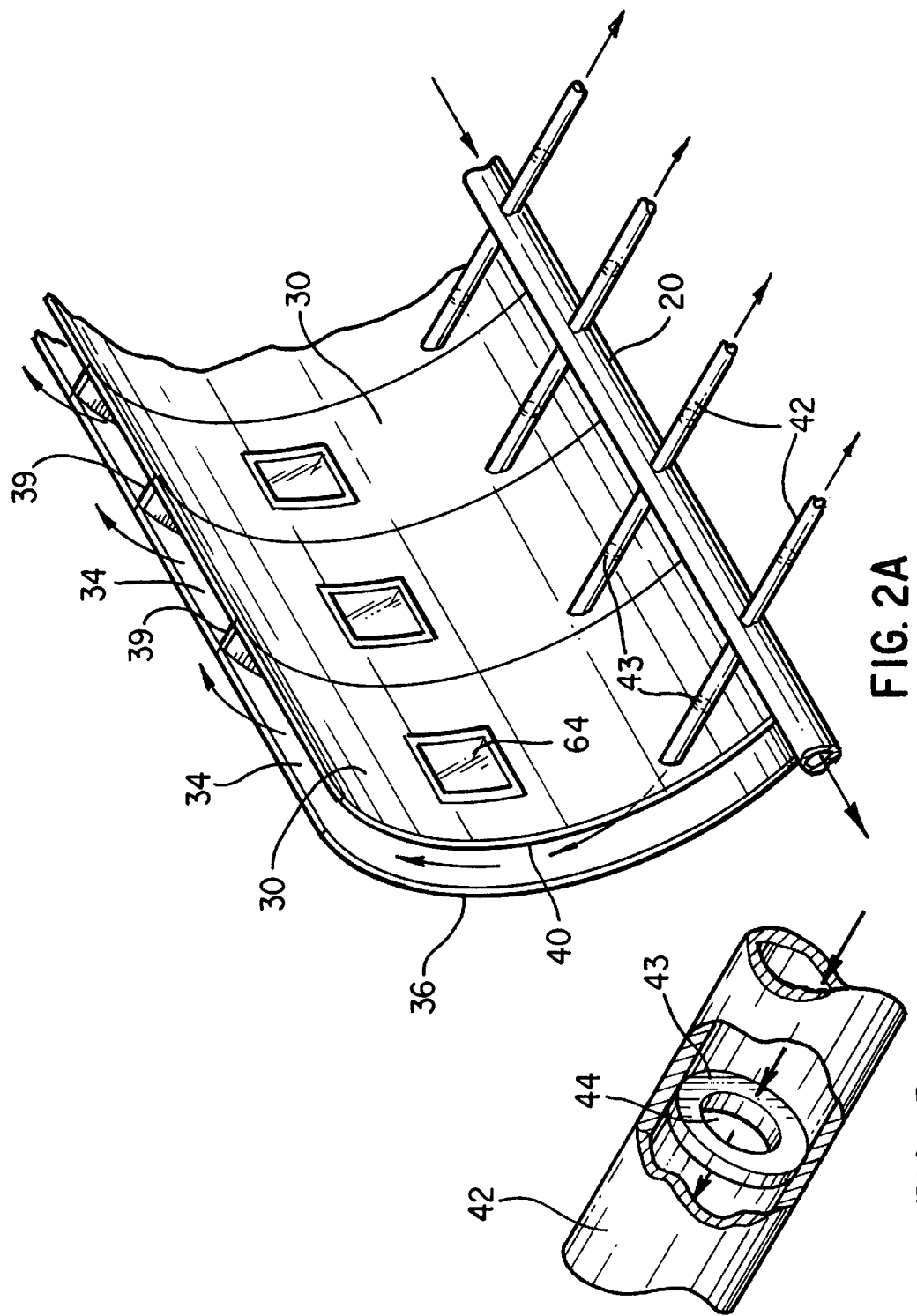
FIG. 2A is schematic view of a plurality of sealed bays and connecting flow passageways employed in the embodiment of FIG. 1.
FIG. 2B is a partially open perspective view of a transverse conduit employed for transmitting bleed air in accordance with the embodiment of FIG. 2A.
Figure 3:
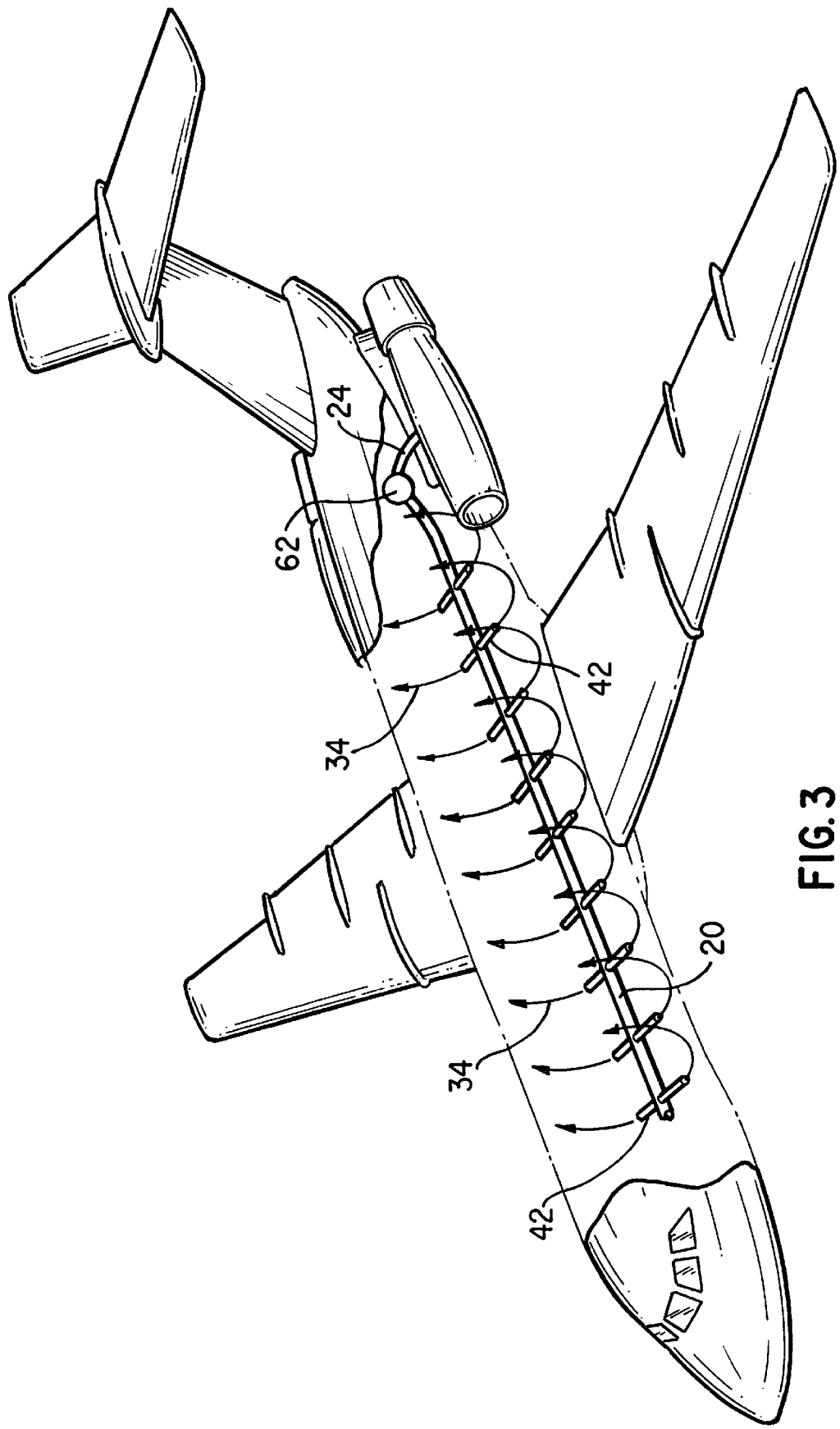
FIG. 3 is flow diagram showing how hot bleed air from the engine is utilized and controlled in the embodiment of FIG. 1 to insulate the passenger cabin.

A hot bleed air supply duct 20 is positioned in an area 22 bounded by cargo floor 18 and the bottom portion of fuselage 10. Supply duct 20 extends in a direction parallel to the longitudinal axis of fuselage 10 as shown in FIGS. 2A and 3, and is in fluid communication with bleed air from the engine, as shown in FIG. 3 at 24.

In order to utilize the hot bleed air in the most efficient manner for insulating passenger cabin 12, naturally occurring bays 30 are utilized. As shown in FIG. 2A, each of the bays 30 creates a fluid passageway 34 defined by the interior panels 40 of passenger cabin 12 and cargo compartment 14, respectively, and the outer skin 36 of fuselage 10. Each naturally occurring bay 30, i.e. pre-existing, extends from cargo floor 18 parallel to outer skin 36 of fuselage 10 until it reaches an attic passageway 32 positioned above passenger cabin 12. In the portion of each bay 30 extending between cargo floor 18 and main floor 16, the interior panels 40 extend parallel to outer skin 36 and define an entry way to fluid passageway 34. In order to maintain uniform flow throughout bays 30, each bays 30 is preferably sealed from adjacent bay located on either side, by a plurality of side walls 39 spaced from one another along the longitudinal axis of the aircraft with each side wall 39 extending between outer skin 36 and interior panels 40 as best shown in FIG. 2A. Each pair of side walls 39 define opposite sides of a sealed bay 30 and, along with outer skin 36, and interior wall panels 40 naturally create fluid passageway 34. Similar passageways 34 extent through each of the bays 30 in order to deliver a stream of hot bleed air adjacent passenger cabin 12, thereby insulating cabin 12 from the cold temperature of outer skin 36 of aircraft fuselage 10 without the need for insulation blankets or the like.

In order for hot bleed air to flow through each pre-existing sealed bay passageway 34, it is necessary to separately connect each sealed bay 30 with supply duct 20. This is accomplished by extending a separate conduit 42 between each bay 30 and duct 20 as shown in FIG. 2A. As show in FIG. 2B, each conduit 42 preferably includes a plug 43 with a central orifice 44 to ensure smooth uniform flow of hot bleed air entering flow passageway 34. It is within the scope of the present invention to simultaneously introduce a smooth stream of hot bleed air into each of the flow passageways 34, thereby creating a stream of hot bleed air extending substantially the length of passenger cabin 12.

As shown by the flow directional arrows 46 in FIG. 1, hot bleed air rises though the flow passageway 34 in each bay 30 and is cooled by heat exchange with the cold outer skin 36 of fuselage 10 until the hot bleed air reaches attic passageway 32. The bleed air may flow through openings 48 into a lower portion 49 of attic 32 or may flow directly into an upper portion 50 of attic duct 32. In either case, the bleed air, recently cooled by heat exchange with the metallic outer skin 36, is now available for introduction into selected portions of the aircraft. For example, bleed air flowing through lower portion 49 of attic passageway 32 may flow through vent grills 54 into passenger cabin 12. The temperature of the bleed air entering lower portion 49 can be easily maintained at a generally desirable temperature of approximately 20° C. by controlling the flow rate entering flow passageway 34 as well as by controlling entry into the cabin 12 to provide a comfortable cabin temperature. Before bleed air enters upper portion 50 of attic 32, it is further cooled by extended contact with metallic outer skin 36. For example, bleed air entering upper portion 50 may cool to a temperature of approximately 3.3° C. or other desired temperature before it is collected for cooling the aircraft avionics system in a conventional manner.

As the bleed air enters passenger cabin 12, it tends to cool and flow toward main floor 16. The bleed air eventually flows into return passageways 58 formed between the side walls 15 of cargo compartment 14 and the interior wall panels 40 forming sealed bays 30. The return air is expelled from the aircraft though vents 60.

Because the bleed air temperature can be controlled, by controlling entry to the various air flow passageways within fuselage 10, it is possible to maintain the air at an appropriate temperature as would conventionally be achieved by insulation blankets in conjunction with the aircraft air conditioning system. In comparison, the present invention only requires use of the air conditioning system when ambient air rises to a temperature which would effectively prevent the heat exchange process from occurring between the hot bleed air and the outer skin of the aircraft.

While the preferred embodiment employs a single supply duct 20, it is considered within the scope of the present invention to employ separate supply ducts on each side of the fuselage 10. Likewise, the number, size and location of conduits 42 is considered within the scope of the present invention based on the desired type i.e. laminar or turbulent, of air flow through each of the passageways 34. While attic passageway 32 is described as having upper and lower portions, it is within the scope of the present invention to employ an attic with any number of separate passageways leading to various compartments within the aircraft.

An aircraft side window 64 may block a portion of flow passageway 34 as shown in FIG. 2A. However, by providing adequate space between window 64 and side walls 39, located on either side, a sufficient area within each bay 30 can be established for air passageways 34 to function as an effective insulating curtain even for those passengers seated next to a window 64.

The present invention provides an air distribution and insulating system employing hot bleed air that is capable of maintaining a comfortable passenger cabin temperature essentially without the need for insulation blankets or other insulating material at a fraction of the cost of conventional systems. The serious corrosion problem of water absorbed into the insulation blanket is effectively eliminated with the bleed air flow insulating system of the present invention. Finally, the present invention completely eliminates the need to employ the aircraft's air conditioning system when cruising at high altitude.

Although various embodiments of the present invention have been described in detail hereabove, it should be clearly understood that many variations and/or modifications of the basic inventive concepts herein taught which appear to those skilled in the pertinent art will still fall within the spirit and scope of the present invention as defined in the appended claims.

What is claimed is:

1. An insulating system employing hot bleed air for insulating an aircraft passenger cabin extending above an aircraft cargo compartment from cold ambient temperatures existing outside the aircraft without the need for insulation blankets between an outer skin of the fuselage and passenger cabin wall panels, comprising:

a supply duct assembly for receiving and transporting hot bleed air through the aircraft fuselage;

at least one bay defined between the passenger cabin wall panels and the outer skin of the aircraft, wherein the at least one bay comprises an air space extending between the outer surfaces of the passenger cabin wall panels and the inner surface of the outer skin, and the air space serves as an air flow passageway located adjacent and within the outer skin of the fuselage and extending from an area adjacent the aircraft cargo compartment to an attic passageway extending above the passenger cabin; and at least one conduit extending between the at least one bay and the supply duct assembly, allowing hot bleed air flowing the supply duct assembly to pass through the at least one conduit and into the at least one bay, whereby the hot bleed air rises through the at least one bay, insulating the passenger cabin from the cold outer skin.

2. The insulating system according to claim 1, wherein a plurality of side-by-side sealed bays are disposed between the passenger cabin wall panels and the outer skin of the aircraft, with a separate conduit extending between each sealed bay and the supply duct assembly.

3. The insulating system according to claim 2, wherein the supply duct assembly is positioned beneath the cargo compartment and extends in a direction substantially parallel to the longitudinal axis of the aircraft.

4. The insulating system according to claim 3, wherein the supply duct assembly comprises a single duct disposed equidistant from opposite sides of the aircraft fuselage.

5. The insulating system according to claim 2, wherein each sealed bay includes an inner wall formed in-part by a side wall of the passenger cabin and in-part by an interior wall panel of the cargo compartment, with each sealed bay inner wall extending parallel to and spaced from the outer skin of the aircraft over the length of the sealed bay between the cargo compartment and the attic passageway.

6. The insulating system according to claim 5, wherein each sealed bay includes a pair of spaced-apart bay side walls extending between the outer skin and the inner wall in order to seal each bay from adjacent bays located on either side thereof.

7. The insulating system according to claim 2, wherein hot bleed air flows from the sealed bays through the attic passageway and into the passenger cabin, maintaining the cabin at a comfortable temperature.

8. The insulating system according to claim 1, wherein the attic passageway includes two portions each receiving a portion of the bleed air from the at least one bay, wherein a lower portion of the attic passageway extends directly above the passenger cabin and an upper portion of the attic passageway extends above the lower portion and adjacent the outer skin of the aircraft, whereby bleed air entering the lower portion of the attic passageway flows directly into the passenger cabin and bleed air further cooled through extended contact with the outer skin enters the upper portion of the attic passageway for cooling aircraft apparatus.

9. The insulating system according to claim 8, wherein the upper portion of the attic passageway is in fluid communication with the aircraft avionics system, thereby allowing further cooled bleed air entering the upper portion of the attic passageway to cool the avionics system.

10. The insulating system according to claim 8, wherein substantially eighty percent of the bleed air rising through the at least one bay enters the lower portion of the attic passageway and the remaining substantially twenty percent of the bleed air rising through the at least one bay enters the upper portion of the attic passageway.

11. An improved passenger aircraft insulating system, comprising
 a fuselage including a passenger cabin extending above a cargo compartment, both the passenger and cargo compartments including wall panels extending parallel to and spaced from an outer skin of the aircraft, forming at least one bay between the outer skin and the wall panels of the cabin and cargo compartments, wherein the at least one bay comprises an air space extending between outer surfaces of the wall panels of the passenger cabin and cargo compartment and the inner surface of the outer skin, and the air space permitting air flow through the bay; and
 means for introducing a stream of hot bleed air into the at least one bay for thermally insulating the passenger cabin from the outer skin while maintaining a comfortable temperature in the passenger cabin.

12. The insulating system according to claim 11, wherein a plurality of separate bays are disposed side-by-side, with each bay extending adjacent the outer skin of the fuselage between the cargo compartment and an attic passageway extending above the passenger cabin.

13. The insulating system according to claim 11, wherein the means comprises a fluid transport system in fluid communication at one end with the hot bleed air produced at an aircraft engine, and in fluid communication to an opposite end with a fluid passageway extending through said at least one bay.

14. The insulating system according to claim 12, wherein the fluid transport system further includes a supply duct disposed beneath the cargo compartment and extending parallel to the longitudinal axis of the aircraft.

15. The insulating system according to claim 13, wherein the fluid transport system further includes a plurality of separate conduits, with a separate conduit extending between the supply duct and a respective one of the bays.

16. The insulating system according to claim 15, wherein each conduit enters a bottom portion of the respective bay located adjacent the cargo compartment.

17. The insulating system according to claim 11, wherein each of the bays is in fluid communication with an attic passageway extending above the passenger cabin, whereby bleed air rising through the bays flows into the attic passageway and enters the passenger cabin through openings in the passenger cabin.

18. A method of insulating a relatively warm passenger cabin extending above a cargo compartment of a passenger aircraft from a relatively colder outer skin of the aircraft fuselage, comprising the steps:
 directing a stream of hot bleed air from an aircraft engine into a supply duct extending parallel to the longitudinal axis of the aircraft; and
 generating a flow of hot bleed air from the supply duct through a conduit network into an air space extending between an inner surface of the outer skin of the aircraft and outer surfaces of the wall panels of the passenger cabin.

19. The method of insulating an aircraft according to claim 18, further including the step of directing the bleed air from the existing space into a lower portion of an attic passageway extending above the passenger cabin and into the passenger cabin through openings in the passenger cabin.

20. The method of insulating an aircraft according to claim 19, including the further step of directing bleed air into an upper portion of the attic passageway extending between the lower portion of the attic passageway and the outer skin of the fuselage, whereby the bleed air entering the upper attic passageway is further cooled by extended contact with the outer skin.

21. The method of insulating an aircraft according to claim 20, further including the step of directing the cooled bleed air flowing through the upper portion of the attic into fluid communication with the aircraft avionics apparatus.

22. The method of insulating an aircraft according to claim 21, wherein the conduit network comprises a supply duct in fluid communication with a plurality of separate conduits.

* * * * *